US012665769B1

(12) United States Patent
    Coleman, II et al.

(10) Patent No.: US 12,665,769 B1
(45) Date of Patent: Jun. 23, 2026

(54) AUTHENTICATION USING AN INTERMEDIARY

(71) Applicant: F5 Networks, Inc., Seattle, WA (US)

(72) Inventors: Michael James Coleman, II, Downingtown, PA (US); Graham Rein Alderson, Seattle, WA (US); Charlie Wilson Lesley, III, Elk Grove, CA (US)

(73) Assignee: F5, Inc., Seattle, WA (US)

( * ) Notice: Subject to any disclaimer, the term of this patent is extended or adjusted under 35 U.S.C. 154(b) by 555 days.

(21) Appl. No.: 16/537,105

(22) Filed: Aug. 9, 2019

Related U.S. Application Data

(60) Provisional application No. 62/854,057, filed on May 29, 2019.

(51) Int. Cl.
    *H04L 9/32* (2006.01)
    *H04L 9/30* (2006.01)

(52) U.S. Cl.
    CPC .......... *H04L 9/3247* (2013.01); *H04L 9/3073* (2013.01)

(58) Field of Classification Search
    CPC ........................... H04L 9/3247; H04L 9/3073
    See application file for complete search history.

(56) References Cited

U.S. PATENT DOCUMENTS

| | | | | |
|---|---|---|---|---|
| 8,145,909 | B1 * | 3/2012 | Agrawal | H04L 9/3247 |
| | | | | 713/180 |
| 9,172,541 | B2 * | 10/2015 | Kolluru | G06Q 20/3829 |

| | | | | |
|---|---|---|---|---|
| 9,807,087 | B2 * | 10/2017 | Hinton | H04L 63/0815 |
| 10,951,606 | B1 * | 3/2021 | Shahidzadeh | H04W 4/029 |
| 10,972,453 | B1 * | 4/2021 | Natarajan | H04L 63/0807 |
| 11,012,441 | B2 * | 5/2021 | Totale | H04L 63/083 |
| 11,252,573 | B1 * | 2/2022 | Shahidzadeh | G06F 21/316 |
| 2006/0129817 | A1 * | 6/2006 | Borneman | H04L 67/53 |
| | | | | 713/170 |
| 2010/0037298 | A1 * | 2/2010 | Lottin | H04L 61/301 |
| | | | | 709/219 |
| 2011/0271321 | A1 * | 11/2011 | Soppera | G06F 21/604 |
| | | | | 726/1 |
| 2012/0278487 | A1 * | 11/2012 | Woelfel | G06F 21/10 |
| | | | | 709/226 |
| 2012/0278872 | A1 * | 11/2012 | Woelfel | H04L 63/0815 |
| | | | | 726/7 |
| 2013/0125226 | A1 * | 5/2013 | Shah | H04W 12/0431 |
| | | | | 726/7 |
| 2013/0227099 | A1 * | 8/2013 | Hinton | H04L 63/0815 |
| | | | | 709/223 |

(Continued)

*Primary Examiner* — Rupal Dharia
*Assistant Examiner* — Devin E Almeida
(74) *Attorney, Agent, or Firm* — Troutman Pepper Locke LLP

(57) ABSTRACT

Technology related to authentication using an intermediary is disclosed. In one example, a method for authentication can include intercepting a first authentication response destined for a server. The first authentication response identifies a server authentication service and is digitally signed by an identity service provider. The first authentication response can be authenticated using a cryptographic key of the identity service provider to validate an identity service provider signature included in the first authentication response. In response to validating the identity service provider signature, a second authentication response can be sent to the server that identifies the server authentication service.

21 Claims, 8 Drawing Sheets

(56)  References Cited

U.S. PATENT DOCUMENTS

| 2018/0131685 | A1* | 5/2018 | Sridhar | ................. | H04L 9/3265 |
| 2018/0288045 | A1* | 10/2018 | Karunakaran | ........ | H04L 63/101 |
| 2020/0259817 | A1* | 8/2020 | Natarajan | ........... | H04L 63/0815 |
| 2020/0389319 | A1* | 12/2020 | Wise | .................... | H04L 9/3247 |

\* cited by examiner

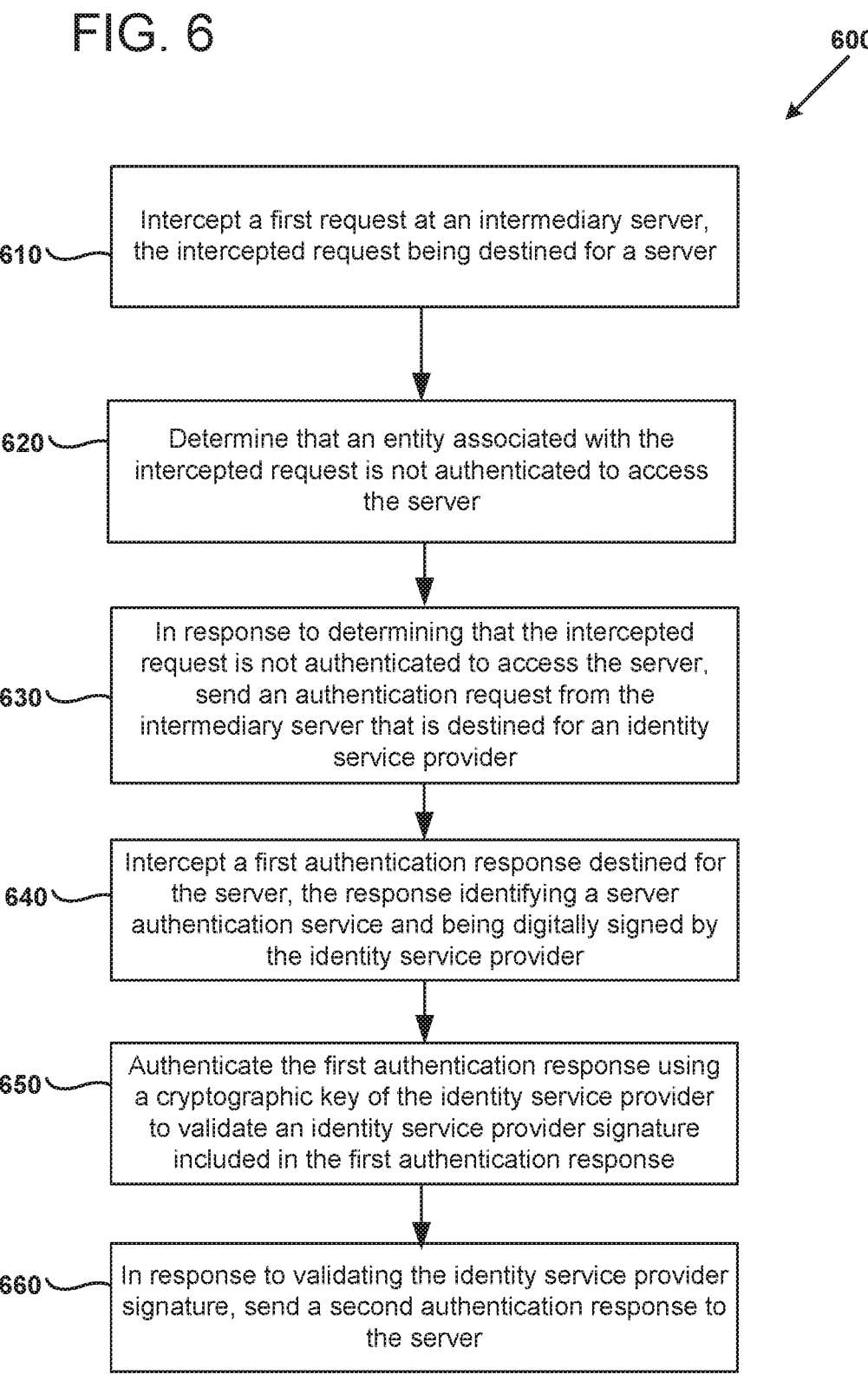

610 — Intercept a first request at an intermediary server, the intercepted request being destined for a server 620 — Determine that an entity associated with the intercepted request is not authenticated to access the server 630 — In response to determining that the intercepted request is not authenticated to access the server, send an authentication request from the intermediary server that is destined for an identity service provider 640 — Intercept a first authentication response destined for the server, the response identifying a server authentication service and being digitally signed by the identity service provider 650 — Authenticate the first authentication response using a cryptographic key of the identity service provider to validate an identity service provider signature included in the first authentication response 660 — In response to validating the identity service provider signature, send a second authentication response to the server

AUTHENTICATION USING AN INTERMEDIARY

CROSS REFERENCE TO RELATED APPLICATION

This application claims the benefit of U.S. Provisional Application Ser. No. 62/854,057, titled "AUTHENTICA-TION USING AN INTERMEDIARY," filed on May 29, 2019, which is incorporated in its entirety by reference herein.

FIELD

This technology generally relates to network traffic management, and more specifically to controlling access to network-accessible resources.

BACKGROUND

A software application can be distributed or partitioned across different computing devices. For example, a client-server architecture can partition tasks between a client device (such as a laptop or mobile device) and one or more server computers connected by an interconnection network (such as the Internet) and managed by a provider of computing service(s) and/or computing resource(s). The server computer(s) can execute software applications to provide virtual resources, software services, and/or content to the client devices. For example, client devices can initiate communication sessions with the server computers by sending requests over the interconnection network to the server computers, and the servers can respond to the requests. However, as the number of client devices seeking access to the server computers increases, intermediary computing devices, such as proxy server(s), can be added between the client devices and the server computers. A proxy server can process requests from the client devices that are destined for the server computers. The proxy server can add a layer of controls between the client devices and the server computers to potentially increase the scalability, availability, security, and/or performance of the client-server architecture. As an example, the added controls can implement access controls to control whether requests from a given client are for-warded to the server computers or otherwise control access to protected network applications. However, as the com-plexity of applications increases and the number of inter-connected devices increases, there can be many challenges in implementing a high performance, highly available, and secure client-server architecture including a proxy.

BRIEF SUMMARY

In one example, a method for authentication is imple-mented in cooperation with a network traffic management system. The network traffic management system can include one or more network traffic management modules, service provider modules, identity provider modules, server mod-ules or client modules. The method can include intercepting a first authentication response destined for a server. The first authentication response identifies a server authentication service and is digitally signed by an identity service pro-vider. The first authentication response is authenticated using a cryptographic key of the identity service provider to validate an identity service provider signature included in the first authentication response. In response to validating the identity service provider signature, a second authentica-tion response is sent to the server that identifies the server authentication service.

In another example, an authentication system includes one or more network traffic management modules, server modules, or client modules, memory comprising pro-grammed instructions stored thereon, and one or more processors. The one or more processors are configured to be capable of executing the stored programmed instructions to intercept a first authentication response destined for a server that identifies a server authentication service and is digitally signed by an identity service provider. The first authentica-tion response is authenticated using a cryptographic key of the identity service provider to validate an identity service provider signature included in the first authentication response. In response to validating the identity service provider signature, a second authentication response is sent to the server that identifies the server authentication service.

In another example, a non-transitory computer readable medium having stored thereon instructions for authentica-tion includes executable code that, when executed by one or more processors, causes the processors to intercept a first authentication response destined for a server that identifies a server authentication service and is digitally signed by an identity service provider. The first authentication response is authenticated using a cryptographic key of the identity service provider to validate an identity service provider signature included in the first authentication response. In response to validating the identity service provider signa-ture, a second authentication response is sent to the server that identifies the server authentication service.

In another example, a network traffic management appa-ratus, includes memory comprising programmed instruc-tions stored thereon and one or more processors. The one or more processors are configured to be capable of executing the stored programmed instructions to intercept a first authentication response destined for a server that identifies a server authentication service and is digitally signed by an identity service provider. The first authentication response is authenticated using a cryptographic public key of the iden-tity service provider to validate an identity service provider signature included in the first authentication response. In response to validating the identity service provider signa-ture, a second authentication response is sent to the server that identifies the server authentication service.

BRIEF DESCRIPTION OF THE DRAWINGS

FIG. 6 is a flowchart of an example method of performing authentication using an intermediary server.

DETAILED DESCRIPTION

Overview

Figure 1:
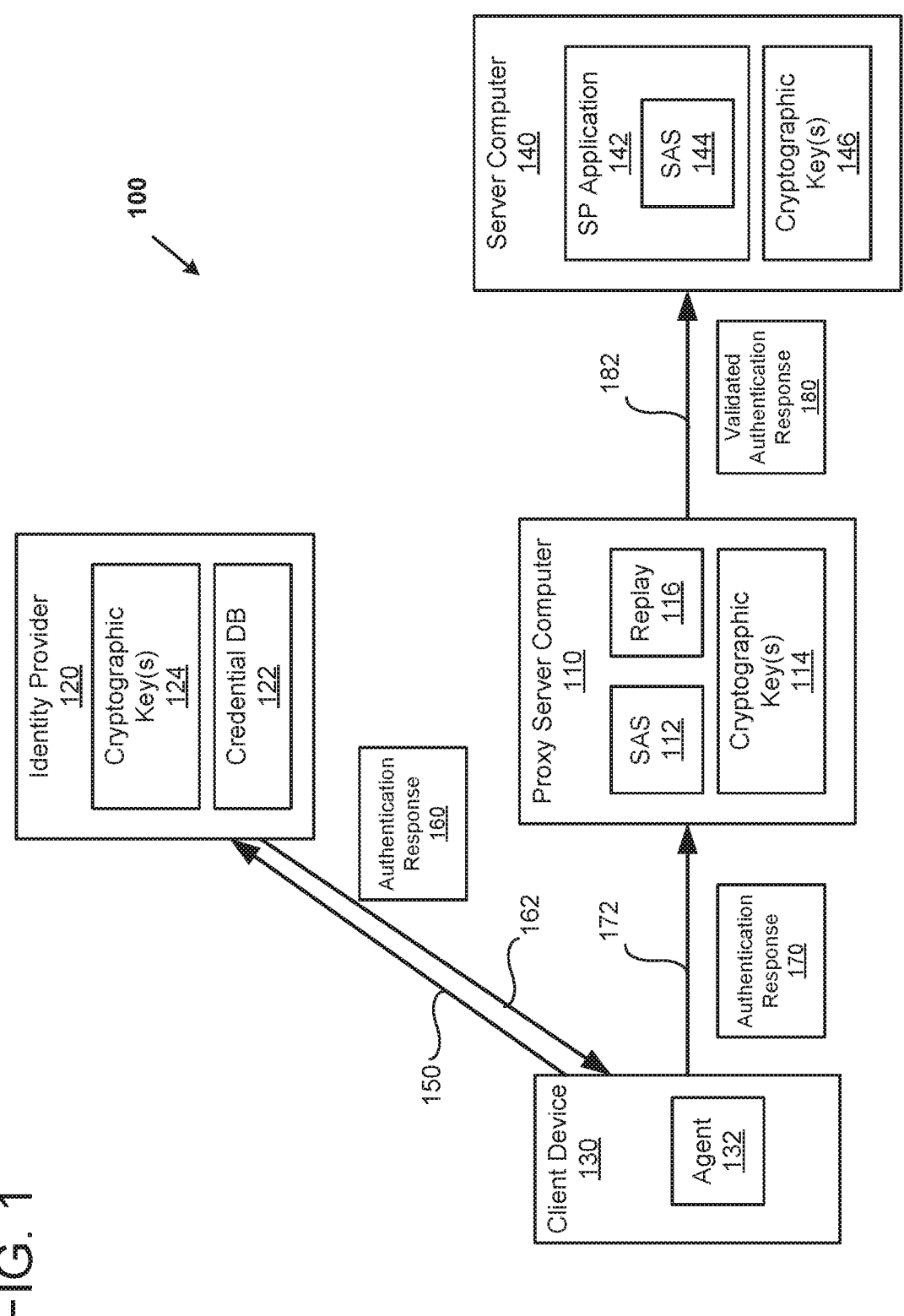
FIG. 1 is a block diagram of an example client-server architecture including an intermediary server computer.

Client-server architectures can include federated architectures. Federated architectures can include semi-autonomous information technology (IT) systems and applications that use agreed-upon standards to interoperate and to share data. Each of the different IT systems can perform specialized services that may be used by one or more of the IT systems. As one example, a federated architecture can include an identity provider (also referred to as an identity service provider) that can authenticate an entity's (e.g., a user, a client device, or a process) credentials, determine one or more attributes about the entity, and provide credentials verifying the entity to a relying party (e.g., a service provider) within the federated architecture. For example, an identity provider can maintain a database of user credentials and authenticated services. A service provider (e.g., a software application executing on a server computer) can send a request via a connecting client to the identity provider to determine whether a given entity is authenticated to use its service, and the identity provider can reply with the determination of whether the given entity is authenticated to use the service. Using an identity provider can enable technologies such as single sign-on, where an entity can use one set of credentials to access multiple different systems and/or services within the federated architecture.

The service provider can trust the information coming from the identity provider when the information is verified as authentic and unmodified. Authentication is the process of verifying that an identity of an entity is genuine. Authorization is the process of verifying whether an entity (e.g., an authenticated entity) has the right to access a protected resource. A communications protocol used for messaging between the service provider and the identity provider can include features, such as a digital signature, for validating the information as authentic and unmodified. A digital signature is a cryptographic transformation of a data payload that is used to verify a source of origin and data integrity of the data payload. As one example, the data payload can be transformed using a hash function to generate a hash code, and the hash code can be encrypted using a cryptographic key to create the digital signature for the data payload. The cryptographic key can be a private key of a public-private key pair that is associated with an identity provider. The service provider can validate the data payload as unmodified and as coming from the identity provider when the service provider can decrypt (also referred to as decipher) the digital signature to create a hash code that matches a hash code generated by the service provider for the data payload using the same hash function as the identity provider. For example, the service provider can decrypt the digital signature using a public key of the public-private key pair that is associated with the identity provider.

One protocol that can be used for communicating between an identity provider and a service provider is the security assertion markup language (SAML) protocol that has been an Organization for the Advancement of Structured Information Standards (OASIS) standard since about 2002. The SAML protocol (also referred to as SAML) is a standard for exchanging authentication data between an identity provider and a service provider. Specifically, SAML uses an extensible markup language (XML)-based markup language to generate a data payload including security assertions (e.g., information that can be used by service providers to make access-control decisions). The identity provider uses a digital signature to sign the security assertions and enable the service provider to validate that the security assertions are authentic and unmodified.

A federated system using SAML can include a client device, a service provider, and an identity provider. A client device (executing an agent, such as a web browser) can request a service from the service provider. When the agent is not yet authenticated to access services of the service provider (e.g., the agent does not have an active session with the service provider), the service provider can issue an authentication request to the identity provider through the client device. The authentication request can include a variety of information, such as an assertion consumer service (ACS) identifier (e.g., a uniform resource identifier (URI) of the service provider) that identifies a return path for an authentication response. The identity provider can verify the credentials provided by the agent (such as by requesting a user identifier and a password from the agent) and determine whether the agent is authorized to access the services of the service provider. The identity provider can generate a security assertion (e.g., indicating the agent is authenticated), sign it with a digital signature, and send an authentication response including the security assertion and the digital signature to the service provider via the client device. The service provider can validate the security assertion in the authentication response using the digital signature. The information within the security assertion can be trusted by the service provider when the security assertion is validated. When the security assertion indicates the agent is authenticated to access the services, the service provider can enable the agent to access services (such as by creating an active session for the agent) if the authenticated entity is authorized.

However, some authentication protocols (e.g., SAML) do not specify how an intermediary server can affect the authentication and/or authorization flow and so challenges can arise when an intermediary server is used. Intermediary servers can include proxy servers, application delivery controllers, network traffic management systems, and other components interposed between the client and the server of a client-server architecture. A proxy is an agent (e.g., a server computer) that is situated in a path of communication between a client and a server that can intercept communications (e.g., network packets, frames, datagrams, and messages) between the client and the server. The proxy can perform various services, such as load balancing, rate monitoring, caching, encryption/decryption, address translation, and access control, for example. The proxy can function as a virtual server that presents a network address of the proxy as the network address for the server application. For example, a client can request a service of the server by sending a request that is destined for the server application (e.g., using the network address of the virtual server as the destination address). The proxy can intercept the request on behalf of the server application. If the client is authorized to access the server application, the proxy can have the request forwarded to the server. Before forwarding, the proxy can modify the request from the client by changing the destination address to be the network address of the server computer. The server computer can respond to the request from the client via the proxy. Specifically, the proxy can intercept the response from the server and modify the response by changing the source address of the response to be the network address of the virtual server. The response can then be forwarded to the client. In this manner, the proxy can be relatively transparent to the client and the server.

The proxy can add a layer of controls between the client devices and the server computers to potentially increase the security and/or performance of the client-server architecture. For example, the proxy can intercept all client traffic destined for the server computer and only allow the traffic to be forwarded after the client has been authenticated and/or authorized to access the server. The addition of the proxy can interrupt an architected flow between the server computer and the identity provider causing changes to the authentication protocol, the proxy server, the service provider application, and/or to the identity provider. Additionally, the added proxy server can potentially create inefficiencies in the authentication process, such as by introducing multiple levels of authentication.

As one example, the proxy server can act as a service provider from the perspective of the identity provider and the proxy server can act as an identity provider from the perspective of the service provider. Thus, the chain of authentication is divided into two pieces where an authentication relationship is present between (1) the proxy server and the identity provider and (2) the proxy server and the service provider. This example architecture can cause changes to the service provider configuration and the identity provider configuration and introduce additional latency for performing two authentications when an agent on the client device requests access to the service provider. Additionally, this example architecture can break the chain of authentication between the service provider and the identity provider by inserting the proxy server between the service provider and the identity provider.

As another example, the proxy server can act as another service provider from the perspective of the identity provider, and the identity provider first authenticates the agent to the proxy server prior to authenticating the agent to the service provider. Once the proxy server authenticates the agent to the proxy server, agent requests to access the service provider can be passed through the proxy server to the service provider (and authenticated by the identity provider if the agent does not have an active session with the service provider). This example architecture can introduce dependencies in the authentication flow, cause changes to the identity provider configuration, and introduce additional latency for performing two authentications when an agent on the client device requests access to the service provider.

However, as described herein, a potentially more transparent, efficient (e.g., lower latency), and secure proxy server can be used to control access to a service provider using an identity provider, as part of an authentication and/or authorization flow. In one example, a proxy server computer can emulate a server authentication service (SAS) (such as a SAML ACS) of the service provider by intercepting an authentication response addressed to the SAS of the service provider that was sent from the identity provider. The authentication response can include an authentication payload including an identifier for the SAS and a digital signature. The proxy server computer can validate the authentication response on behalf of the service provider by validating the digital signature using a key (e.g., a public key) of the identity provider. In response to validating the authentication response (e.g., validating that the agent of the client device is authenticated to access the service provider), the proxy server computer can forward, or replay, the authentication response to the SAS executing on the server computer of the service provider. The service provider can also validate the authentication response using the public key of the identity provider. In this manner, the proxy server computer can be relatively transparent to the authentication and authorization flow since the authentication response from the identity provider can be consumed by the service point and both the service point and the identity provider can potentially function without configuration changes due to the added proxy server computer.

As another example, the authentication and/or authorization flow can use the SAML protocol. Specifically, the proxy server can provide ACS functionality and a SAML authentication response validation service which can be leveraged in a proxy architecture when securing proxied SAML service provider enabled applications. The proxy architecture can include full proxies and/or reverse proxies. The proxy server can secure proxied SAML service-point-enabled applications by emulating the ACS of the service provider. Emulating the ACS of the service provider can include redirecting network traffic (e.g., authentication responses) addressed to the ACS of the service provider to the proxy server computer, and providing the ACS identifier in an authentication request to the identity provider when a client agent requests access to the service point. The proxy server can enable relatively transparent verification of any presented SAML authentication response by validating a signature/digest of the authentication response. The proxy server can parse and/or inspect attributes within the authentication response and make additional access control decisions based on the attributes. These features enable the proxy server to potentially employ multiple security verifications prior to allowing or replaying the SAML authentication response to the protected/secured proxied SAML service-point-enabled applications. Additionally, the proxy server can potentially simplify the SAML flow authentication process and reduce SAML service-point configuration changes when compared to other solutions for securing SAML service-point-enabled applications in proxied architectures.

Example Architectures for Authentication Using an Intermediary

FIG. 1 is a block diagram of an example client-server architecture 100, including an intermediary server, that can be used to perform a computing task that is distributed among different components of the client-server architecture 100. Specifically, FIG. 1 illustrates an authentication flow that is initiated by the identity provider 120. The client-server architecture 100 can include a proxy server computer 110, an identity provider 120, a client device 130, and a server computer 140. The client-server architecture 100 can be implemented using a client-server architecture as described in more detail with reference to FIG. 7, where the different components (110, 120, 130, 140) of the client-server architecture can be implemented using a computing environment as described in more detail with reference to FIG. 8.

As one example, the client device 130 can request access to services provided by the server computer 140 using the identity provider 120, and the proxy server computer 110 can control access to the server computer 140 based on a response from the identity provider 120. Specifically, the client device 130 can execute an agent 132 (e.g., a browser or other software application) that requests a service of a service-point (SP) application 142 executing on the server computer 140. The server computer 140 can be secured by the proxy server computer 110. Specifically, the proxy server computer 110 can control access to the server computer 140 by preventing unauthenticated entities (e.g., users, processes, and/or devices) from accessing the server computer 140 and allowing authenticated entities to access the server computer 140. The identity provider 120 can be used to authenticate an entity for a given resource (e.g., the SP application 142) using a credential database (DB) 122 that associates an entity identifier with authentication information (e.g., a password or a hashed password) of the entity. Additionally, the credential DB 122 can include additional attributes about the entity and/or the services that are accessible by the entity.

As illustrated in FIG. 1, the authentication flow is initiated by the identity provider 120 and the flow can conform to a custom and/or standard authentication protocol (such as SAML). For example, the agent 132 of the client device 130 can access a portal (not shown) of the identity provider 120 using the communication channel 150 to request access to the SP application 142. The agent 132 can provide an identifier and credentials to the portal so that the identity provider 120 can verify whether the entity associated with the provided identifier and credentials is authenticated to access the SP application 142. If the entity is authenticated, the identity provider 120 can generate an authentication response 160 that is destined for the server computer 140. The authentication response 160 identifies a server authentication service (e.g., SAS 144), and is digitally signed by the identity provider 120. Specifically, the authentication response 160 can include a digital signature and a payload (also referred to as an assertion) that includes an identifier for the server authentication service (such as a URI) and/or other attributes describing one or more aspects of the identity provider, the entity (e.g., the client device 130 or the agent 132) requesting access (also referred to as the subject), a level of access based on attribute data, the service being requested, information about the request (e.g., a time the request was made), and so forth. The payload is digitally signed using a cryptographic algorithm and an encryption key from the cryptographic key(s) 124. For example, the encryption key can be a private key of a public-private key-pair of the identity provider 120. As another example, the signing encryption public key can be a symmetric key that is shared between the identity provider 120, the proxy server computer 110, and the server computer 140. The digital signature can be used to verify the integrity of the payload of the authentication response 160. The identity provider 120 can transmit the authentication response 160 to the client device 130 using the communication channel 162.

The cryptographic key(s) 124 can include additional keys used to perform various cryptographic functions. For example, the cryptographic key(s) 124 can include one or more public keys of the server computer 140. A public signature key of the server computer 140 can be used to validate a signature of a request signed by the server computer 140 or on behalf of the server computer 140 by the proxy server computer 110. A public encryption/decryption key of the server computer 140 can be used to encrypt information that is sent from the identity provider 120 and intended to remain confidential until decrypted by the server computer 140 or on behalf of the server computer 140 by the proxy server computer 110. For example, the payload of the authentication response 160 can be encrypted using the public encryption/decryption key of the server computer 140. The public signature key and the public encryption/decryption key can be the same or different keys.

The client device 130 can process the authentication response 160 to generate an authentication response 170. The authentication response 170 includes at least some of the information provided in the authentication response 160 and may contain additional information provided by the client device 130. Specifically, the authentication response 170 includes the payload and the digital signature generated by the identity provider 120. The authentication response 170 is destined for the server computer 140 by using a public network address of the server computer 140. The client device 130 can send the authentication response 170 over a communication channel 172.

The proxy server computer 110 can receive the authentication response 170. For example, the proxy server computer 110 can include a virtual server (e.g., SAS 112) having a network address matching the public network address for the server computer 140. The proxy server computer 110 can provide the SAS 112 at the public URI of the SAS 144 so that the SAS 112 can act on behalf of the SAS 144. The server computer 140 can have a private network address that is available for use by the proxy server computer 110 but is not readily available to the public. The proxy server computer 110 can determine whether communications, such as the authentication response 170, are to be forwarded to the server computer 140 or whether the communications are to be dropped or redirected. For example, the proxy server computer 110 can determine whether a particular client (e.g., the client device 130) is authenticated to communicate with the server computer 140, and communications can be forwarded to the private network address of the server computer 140 by the proxy server computer 110 when the client is authenticated to communicate with the server computer 140. In this manner, communications destined for the server computer 140 using the public network address of the server computer 140 are intercepted by the proxy server computer 110 before reaching the server computer 140, and authenticated communications can be forwarded by the proxy server computer 110 to the private network address of the server computer 140.

The proxy server computer 110 can determine whether a particular client is authenticated and/or authorized to communicate with the server computer 140 based on the information provided by the identity provider 120. Specifically, the proxy server computer 110 can use the authentication response 170 to determine whether a particular client is authenticated and/or authorized to communicate with the server computer 140. As one example, the authentication response 170 can indicate the service (e.g., SAS 144 that is emulated by SAS 112) that is used to validate the payload of the authentication response 170. The SAS module 112 can validate the payload of the authentication response 170 using a cryptographic algorithm and a decryption key from the cryptographic key(s) 114. Specifically, the SAS module 112 can generate a hash code using the data payload and the same hash function as the identity provider 120. The data payload is validated as unmodified and as coming from the identity provider 120 when the generated hash code matches the decrypted signature of the authentication response 170. For example, the identity provider 120 can use a private key of a public-private key pair to encode the signature and the decryption key (stored in the cryptographic key(s) 114) can be a public key of the public-private key pair. As another example, the identity provider 120 can use a symmetric key to encode the signature and the decryption key can be the same symmetric key. After the payload of the response 170 is validated, the information within the payload can be trusted as unmodified and authentic.

The cryptographic key(s) 114 can include additional keys used to perform various cryptographic functions. For example, the cryptographic key(s) 114 can include one or more private keys of the server computer 140. A private signature key of the server computer 140 can be used to sign a request sent by the server computer 140 or sent on behalf of the server computer 140 by the proxy server computer 110. A private encryption/decryption key of the server computer 140 can be used to decrypt information that is sent encrypted from a computing device (such as the identity provider 120) and is destined for the server computer 140. The information can be encrypted using a public encryption/decryption key of the server computer 140. The private signature key and the private encryption/decryption key can be the same or different keys.

The proxy server computer 110 can determine whether a particular client is authenticated and authorized to communicate with the server computer 140 based on the validated information and/or additional criteria. For example, the proxy server computer 110 can parse the validated payload to obtain attributes about the client, the authentication response 170, and/or the identity provider. The attributes can be used as a key for a data structure or database used to determine additional access criteria. For example, the proxy server computer 110 can use the attributes to restrict an authenticated entity to a threshold amount of accesses of the server computer 140 or to a subset of services provided by the server computer 140. As another example, the proxy server computer 110 can use the attributes and other network traffic information to filter out responses that may be part of a denial of service attack.

When the proxy server computer 110 determines that the client is authenticated and authorized to communicate with the server computer 140, the proxy server computer 110 can generate a validated authentication response 180 to send to the server computer 140 using a communication channel 182. For example, the proxy server computer 110 can include replay logic 116 that can forward or replay the authentication payload and digital signature to the server computer 140. The validated authentication response 180 can be addressed to a private network address of the server computer 140. For example, the validated authentication response 180 can be addressed to the SAS module 144. The validated authentication response 180 can include information from the authentication response 170 and may include additional information, such as additional information about the client 130. Specifically, the validated authentication response 180 includes the payload and signature from the authentication response 170. Additional information about a particular client can be determined using the parsed attributes as a key into a database containing information about various clients that access the server computer 140. The additional information can be added to the authentication response 180 and/or to other traffic destined for the server computer 140 that transits the proxy server computer 110.

The server computer 140 can receive the validated authentication response 180 and process the validated authentication response 180 as if the response 180 came from the identity provider 120 without going through the proxy server computer 110. Specifically, the SAS module 144 can revalidate the validated authentication response 180 using the decryption key of the identity provider (stored in cryptographic key(s) 146). Accordingly, the authentication relationship between the identity provider 120 and the server computer 140 can be maintained, even with the addition of the proxy server computer 110. By maintaining this relationship, the proxy server computer 110 can be relatively transparent to the server computer 140 and the identity provider 120.

Additionally, by sending validated authentication responses, but not unvalidated authentication responses to the server computer 140, the proxy server computer 110 can potentially increase a security, efficiency, and/or availability of the server computer 140. For example, authentication responses that are not validated (such as responses that have invalid signatures or fail other criteria of the proxy server computer 110) can be blocked from reaching the server computer 140. Blocking invalid authentication responses can free up resources of the server computer 140 that would otherwise be used to process an invalid authentication response. Validating the authentication responses at both the proxy server computer 110 and the server computer 140 can provide multiple layers of controls for validating the authentication responses. By providing the multiple layers of controls, the security of the client/server architecture 100 can potentially be enhanced. For example, the proxy server computer 110 can be used to implement enterprise-level controls that are independent of the individual controls employed by the server computer 140 and/or the identity provider 120.

It should be appreciated by one of ordinary skill in the art having the benefit of the present disclosure, that the communications channels 150, 162, 172, and 182 have been simplified for the ease of illustration. The communications channels 150, 162, 172, and 182 can be implemented using multiple networks and/or networking devices to interconnect the components of the client-server architecture 100.

Figure 2:
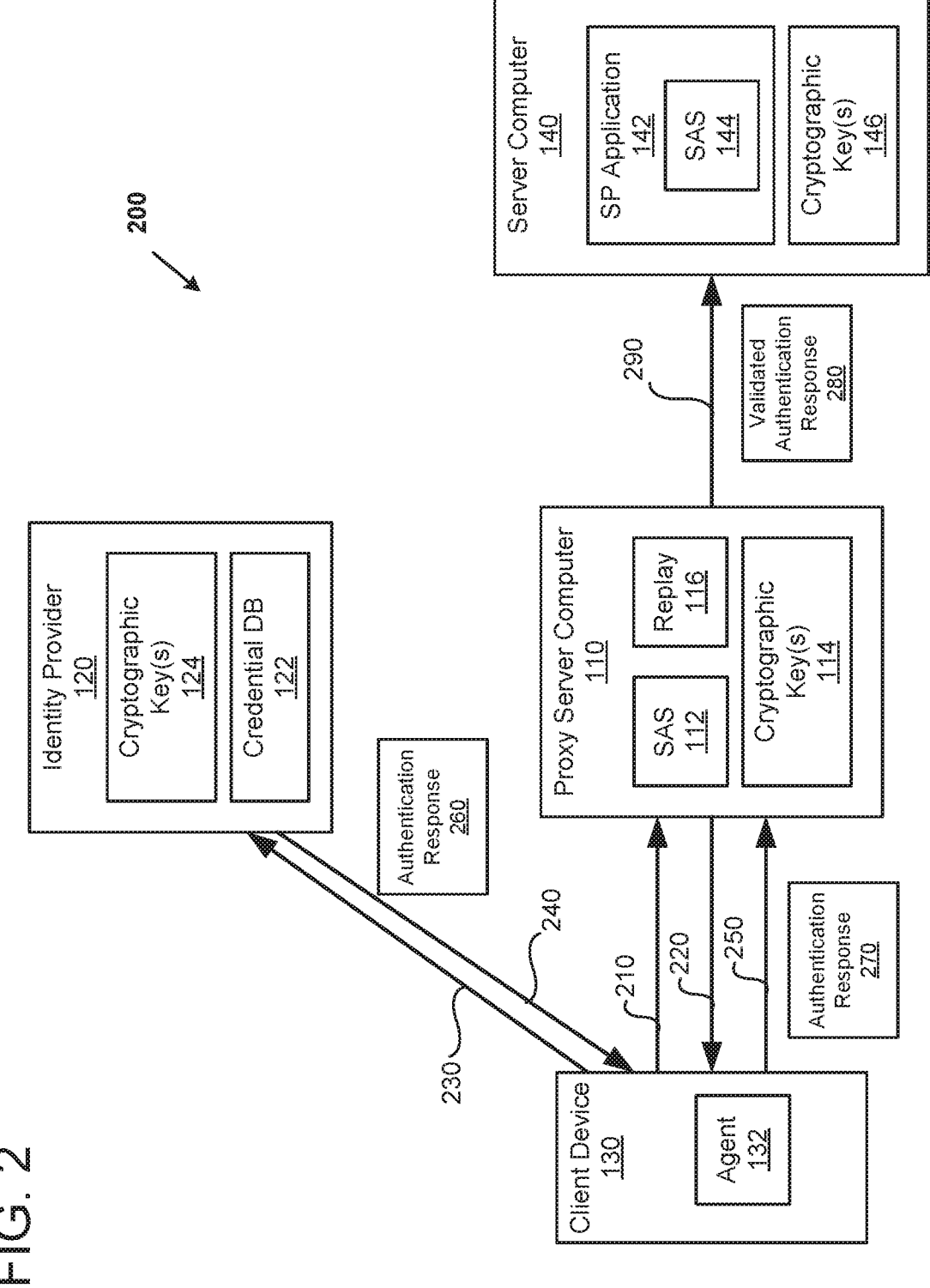
FIG. 2 is a block diagram of an example client-server architecture including an intermediary server computer.

FIG. 2 is a block diagram of an example client-server architecture 200, including an intermediary server, that can be used to perform a computing task that is distributed among different components of the client-server architecture 200. Specifically, FIG. 2 illustrates an authentication flow that is initiated by the proxy server computer 110 on behalf of the server computer 140. The client-server architecture 200 can include the proxy server computer 110, the identity provider 120, the client device 130, and the server computer 140. The client-server architecture 200 can be implemented using a client-server architecture as described in more detail with reference to FIG. 7, where the different components (110, 120, 130, 140) of the client-server architecture can be implemented using a computing environment as described in more detail with reference to FIG. 8.

As one example, the client device 130 can request access to services (e.g., a URI or a webpage) provided by the server computer 140 by sending a request that is destined for the server computer 140. Specifically, the client device 130 can transmit a request addressed to the public address of the server computer 140 over the communication channel 210. The proxy server computer 110 can intercept the request on behalf of the server computer 110. The proxy server computer 110 can determine whether the client device 130 is authenticated to access the server computer 140. If the client device 130 is not currently authenticated to access the resources, the proxy server computer 110 can begin the authentication flow (e.g., using the SAML protocol) by generating an authentication request that is destined for the identity provider 120 via the client device 130. For example, the authentication request can include an identifier for the server authentication service (SAS) 144, information about the server computer 140, the request, and/or the client device 130. The authentication request can be transmitted to the client device 130 using the communication channel 220. The authentication request can be redirected from the client device 130 using the communication channel 230. The authentication request can be augmented with additional information from the client device 130.

The identity provider 120 can receive the authentication request and determine whether the subject of the request (e.g., also referred to as the requestor) is authenticated to access the requested resources. For example, the identity provider 120 can use the credential database (DB) 122 and information obtained from the client device 130 (e.g., from the authentication request and/or from additional interactions (not shown) with the client device 130) to determine whether the subject of the request is authenticated to access the requested resources. If the subject of the request is authenticated, the identity provider 120 can generate an authentication response 260 indicating that the subject is authenticated. A payload of the authentication response 260 can include various information, such as information about the subject (e.g., the client device 130), the issuer (e.g., the identity provider 120), the environment (e.g., a time the authentication is made), a level of access for the subject, and/or resources that are accessible by the subject (e.g., the SP application 142 and the SAS module 144). The payload can be digitally signed using a cryptographic algorithm and the encryption key of the identity provider stored in the cryptographic key(s) 124. The authentication response 260 can be addressed to the client device 130 and identify the server computer 140 as a target or consumer of the response. The authentication response 260 can be transmitted to the client device 130 using the communication channel 240.

The client device 130 can process the authentication response 260 to generate an authentication response 270. The authentication response 270 includes at least some of the information provided in the authentication response 260 and may contain additional information provided by the client device 130. Specifically, the authentication response 270 includes the payload and the digital signature generated by the identity provider 120. The authentication response 270 is destined for the server computer 140 because it is addressed to the public network address of the server computer 140. The client device 130 can send the authentication response 270 over a communication channel 250.

The proxy server computer 110 can receive the authentication response 270. For example, the proxy server computer 110 can include a virtual server having a network address matching the public network address for the server computer 140. The proxy server computer 110 can direct responses identifying the SAS 144 as a target to be processed by the SAS 112. In this manner, the SAS 112 can emulate or act on behalf of the SAS 144, and responses destined for the server computer 140 can be intercepted by the proxy server computer 110. The SAS 112 can authenticate the authentication response 270 using the decryption key of the identity provider 120 (stored in the cryptographic key(s) 114) to validate the digital signature included in the authentication response 270. If the authentication response 270 is not validated (e.g., the payload has been modified and/or the signature has been forged), the proxy server computer 110 can drop the authentication response 270. However, if the authentication response 270 is validated, the information in the payload can be trusted as authentic and unmodified. The payload can be further processed to determine attributes about the subject of the request (e.g., the client device 130) and to determine a level of access to be provided to the subject of the request. As one example, the level of access to be provided can be identical to the level of access indicated by the identity provider 120. As another example, the proxy server computer 110 can modify the level of access provided based on additional criteria related to the request, the requestor, the environment, and so forth.

If the subject of the request is authenticated to access the server computer 140, a validated authentication response 280 can be generated by the proxy server computer 110 and transmitted via the communication channel 290 to the server computer 140. The validated authentication response 280 can be identical to the authentication response 270 (e.g., the proxy server computer 110 can be transparent with respect to the response) or the validated authentication response 280 can include additional information provided by the proxy server computer 110. The validated authentication response 280 identifies the SAS 144 and includes the payload and the digital signature provided by the identity provider 120 so that the SAS 144 can independently validate the validated authentication response 280.

The proxy server computer 110 can perform additional cryptographic functions on behalf of the server computer 140. For example, the proxy server computer 110 can sign an authentication request on behalf of the server computer 140, using a signing key of the server computer 140. The signing key can be a private key of a public/private key pair of the server computer 140, and a signature validation key can be the public key of the public/private key pair of the server computer 140. The identity provider 120 can validate the signature of the authentication request prior to responding to the authentication request. For example, the identity provider 120 can drop authentication requests that are not authenticated using the signature validation key, and the identity provider 120 can respond to authentication requests that are authenticated using the signature validation key.

As another example, the proxy server computer 110 can decrypt a payload (e.g., a security assertion) that is encrypted by the identity provider 120. Specifically, the identity provider 120 and the server computer 140 and/or the proxy server computer 110 can exchange encryption/decryption keys. For example, the server computer 140 can provide a public encryption/decryption key to services with which it is to exchange encrypted messages, such as the identity provider 120 and/or the proxy server computer 110. The server computer 140 can use a private encryption/decryption key to decrypt the messages that are encrypted using the public encryption/decryption key. Additionally, the server computer 140 can provide the private encryption/decryption key to the proxy server computer 110 so that the proxy server computer 110 can perform encryption and decryption on behalf of the server computer 140. Specifically, security assertions within an authentication response that are encrypted by the identity provider 120 can be decrypted by the proxy server computer 110 using the private encryption/decryption key of the server computer 140. The encryption/decryption key pair and the signing/validation key pair can be the same or different.

It should be appreciated by one of ordinary skill in the art having the benefit of the present disclosure, that the communications channels 210, 220, 230, 240, 250, and 290 have been simplified for the ease of illustration. The communications channels 210, 220, 230, 240, 250, and 290 can be implemented using multiple networks and/or networking devices to interconnect the components of the client-server architecture 200.

Figure 3:
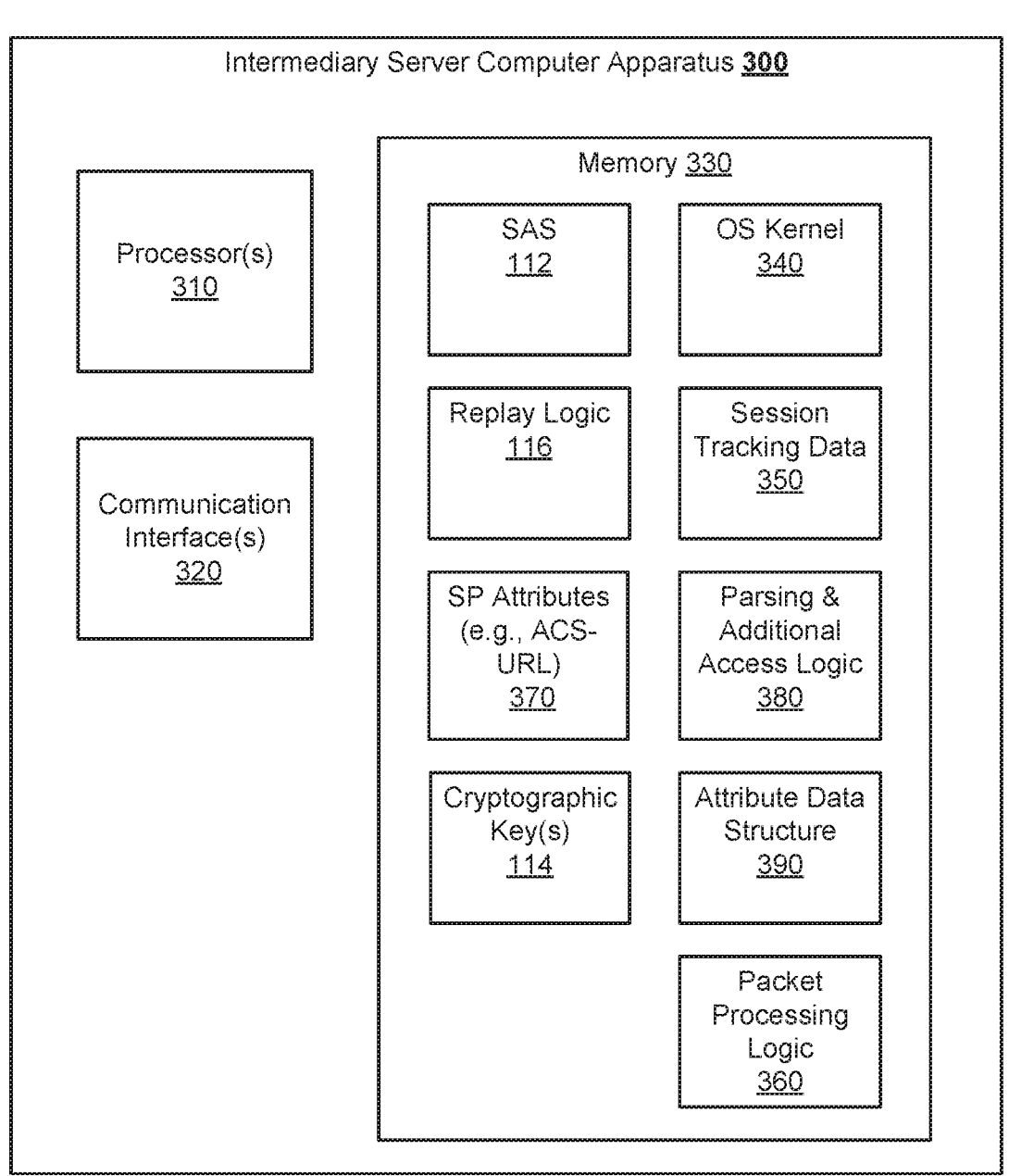
FIG. 3 is a block diagram of an example intermediary server computer apparatus.

FIG. 3 is a block diagram of an example intermediary server computer apparatus 300. For example, the intermediary server computer apparatus 300 can be a proxy server computer, an application delivery controller, a network traffic management system, or another component configured to be in a communication path between a client and a server of a client-server architecture. The intermediary server computer apparatus 300 can be implemented using a computing environment as described in more detail with reference to FIG. 8.

The intermediary server computer apparatus 300 can include one or more processor(s) 310, one or more communication interface(s) 320, and memory 330. The processor 310, communication interface 320, and the memory 330 can be coupled together with an interconnect (not shown) so that the components of the computer apparatus 300 can communicate with each other using the interconnect. The communication interface 320 can be used to send and receive communications (e.g., network packets) with other computing devices, such as a client and a server. The processor 310 can be used to execute computer-executable instructions that are stored in the memory 330 and/or storage resources (not shown). The computer-executable instructions can be organized into software routines (also referred to as modules or components) comprising executable code to perform various computing tasks. It should be noted that while FIG. 3 illustrates one organization of routines, other organizations are possible. For example, the illustrated routines can be sub-divided into smaller routines and/or combined into larger routines. The memory 330 can also include structured and/or unstructured data that is used by the software routines to perform the computing tasks.

The operating system (OS) kernel 340 can include different software routines for managing different aspects of the execution of programs and for interfacing with the hardware of the intermediary server computer apparatus 300. For example, the OS kernel 340 can manage the loading and removal of software applications and other routines into the memory 330 of the computer apparatus 300; the OS kernel 340 can manage storage resources of the computer apparatus 300; the OS kernel 340 can manage processes and/or threads executing on the processor 310; the OS kernel 340 can manage power states of the computer apparatus 300; the OS kernel 340 can provide an interface for applications and other routines to send and receive communications (e.g., network packets) using the communications interface 320; and the OS kernel 340 can enable inter-process communication between different routines executing on the computer apparatus 300.

Session tracking data 350 can track entities that have been authenticated and/or are authorized to use the server computer resources. For example, a particular entity, associated with a particular source address or other identifier, can be assigned a session identifier when the entity is authenticated and authorized to use the server computer. An entry for an authenticated and authorized entity can be created when the entity is authenticated and authorized. The entry can include information that identifies the entity (e.g., a source address and/or an entity identifier), a session identifier, and other information associated with the entity and/or the session (such as information to be sent with packets to a server during an active session). The entry can be removed when the session ends.

The packet processing logic 360 can process communications that are received by the communication interface 320. For example, the packet processing logic 360 can parse fields of a network packet to determine information such as the source of the packet, the destination of the packet, and the type of the packet. These fields can be used to determine how to further process the network packet, such as which routines will be used to process the packet. For example, one or more of the fields can be used as a key to search session tracking data 350 to determine whether an entity associated with the packet is authenticated and authorized to access the server. When the packet processing logic 360 determines that the destination of the packet is the public network address of the server and the entity associated with the source of the packet is not authenticated and authorized to access the server, the packet can be forwarded to the SAS routine 112 for further processing. When the packet processing logic 360 determines that the destination of the packet is the public network address of the server and the entity associated with the source of the packet is authenticated and authorized to access the server, the destination address of the packet can be changed to the private network address of the server so that the packet can be forwarded to the server using the communication interface 320. Additional information can be forwarded to the server with each packet, such as a cookie or other data that is identified by the session tracking data 350.

The SAS module 112 can process requests by entities that are not authenticated to access the server. The SAS module 112 can generate a request to the identity provider to authenticate the entity. The request can include information about the entity, the authentication flow, and/or the service being requested. For example, the service provider attribute data structure 370 can include information such as a URI for the server authentication service, an authentication flow protocol used to authenticate users of the server, a URI or network address of an identity provider, and so forth. The information stored in the service provider attribute data structure 370 can be used to generate the request for identity provider. For example, the request can include the URI of the server authentication service. The request can be sent to the identity provider (via the client) using the communication interface 320.

The SAS module 112 can process authentication responses from the identity provider. A given response can include authentication information (e.g., a security assertion) in a data payload that is digitally signed by the identity provider. The SAS module 112 can authenticate the payload using the decryption key of the identity provider (e.g., stored in the cryptographic key(s) 114) to validate the digital signature included in the response. If the validated response indicates that the requestor of the server resources is authenticated to use the resources, additional processing can be performed by the parsing and additional access logic 380 and/or the response can be forwarded to the server by the replay logic 116.

The parsing and additional access logic 380 can parse the data payload of the authentication response to determine attributes of the authenticated entity, the client, the identity provider, and so forth. One or more of the attributes can be used as a key or keys to obtain additional information from the attribute data structure 390. For example, the attribute data structure 390 can include additional conditions or criteria for allowing the authenticated entity to access the server. As another example, the attribute data structure 390 can include information to include with communications sent from the authenticated entity to the server. The additional layer of controls provided by the parsing and additional access logic 380 can potentially enable finer grain control over the access decision than enabled by the identity provider alone. If the parsing and additional access logic 380 determines that all conditions for access are met, the authentication response can be forwarded to the server by the replay logic 116.

The replay logic 116 can send a validated authentication response to the server using the communication interface 320. For example, the replay logic 116 can address the validated authentication response to the private network address of the server.

Example Methods for Authentication Using an Intermediary

Figure 4:
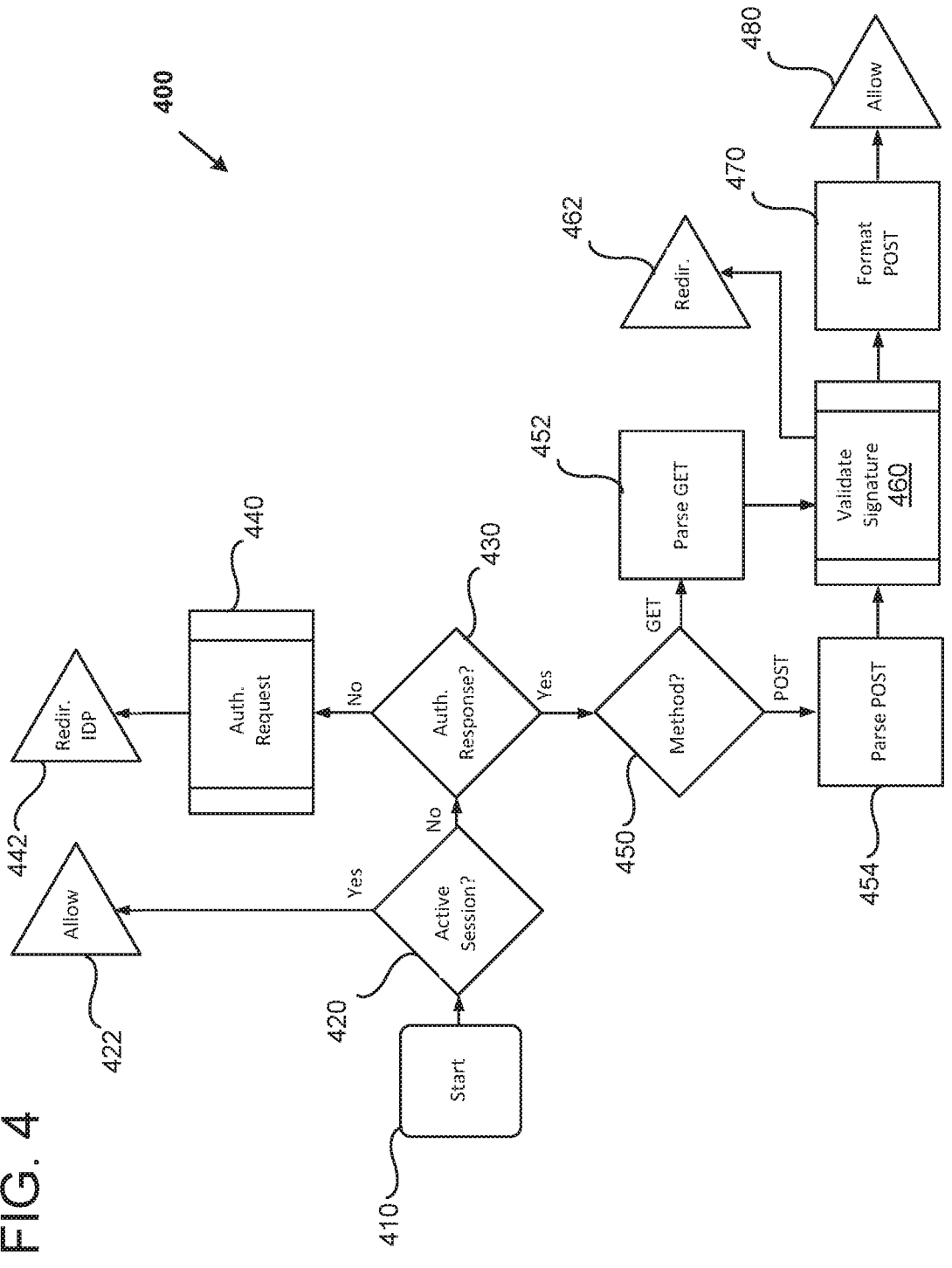
FIG. 4 is a flow diagram of an example method of performing authentication using an intermediary server.

FIG. 4 is a flow diagram of an example method 400 of performing authentication using an intermediary server. For example, the method 400 can be implemented by the intermediary server computers 110 and 300, such as described above in reference to FIGS. 1-3. For example, computer-executable instructions for carrying out the method 400 can be stored in a computer-readable memory of the intermediary server computer, and the instructions can be executed by a processor of the intermediary server computer to perform the method 400.

At 410, a client device can send a packet to the intermediary server. For example, an agent of the client device, such as a web browser or other software application, can send a request for a resource (e.g., a webpage) hosted at a public URI of a service point using the HTTP or HTTPS protocol. The request for the resource (encapsulated within the packet) can cause a new communication connection (e.g., a TCP connection) to be formed between the client device and the intermediary server. Alternatively, an existing communication connection between the client device and the intermediary server can already be present. The packet can include a destination address corresponding to a public network address of the service point. The intermediary server can intercept the request on behalf of the service point.

At 420, it can be determined whether a session has been established between the client device and the intermediary server. For example, when a session has been established, the packet from the client device can include a session cookie that provides a session identifier for the existing session. The session cookie can be created after the client device is verified to be authenticated to access the service point, such as by an identity provider. If the packet from the client device includes a valid session identifier, the packet can be forwarded (at 422) to the service point. If the packet from the client device does not include a valid session identifier, the packet can be further processed at 430, and an authentication and authorization flow, such as a flow including a SAML flow, can be initiated.

At 422, the packet can be sent from the intermediary server to the service point. For example, a destination address of the request from the client device can be translated from the public network address to a private network address of the service point, and the intermediary server can transmit the packet over an interconnection network or directly to the service point. The packet can be modified to include additional information, such as the session identifier and/or additional information about the client device or an entity (e.g., a user or process) associated with the client device. Additionally or alternatively, the additional information can be sent to the service point in a separate packet.

At 430, it can be determined whether the packet includes an authentication response from an identity provider. As one example, it can be determined whether the packet includes a SAML response. If the packet does not include an authentication response, the method 400 can continue at 440. If the packet does include an authentication response, the method 400 can continue at 450.

At 440, the packet does not include an authentication response and the intermediary server can generate an authentication request that is destined for the identity provider. The authentication request can include various information such as an identifier for a server authentication service (SAS), information about the server, the request, and/or the client device. As a specific example, the authentication request can be formatted according to the SAML protocol, where a SAML authentication request can include a version of the SAML protocol that is being used and an identifier that identifies an assertion consumer service (ACS) used by the server.

At 442, the authentication request can be encapsulated within a response that is transmitted from the intermediary server to an agent of the client device. For example, the response can be formatted according to the HTTP or HTTPS protocols. The response can include a status code (e.g., 302 redirect) indicating that the response is to be redirected from the client device to the identity provider.

At 450, the packet including the authentication response can be further processed. Specifically, a method of the packet can be determined. For example, the method of the packet used in an identity-provider-initiated flow (e.g., where the client device initiated access to the service point by accessing a portal of the identity provider) can be a post method. As another example, the method of the packet used in a proxy- or service-point-initiated flow (e.g., where the client device requested a resource of the service-point without going through the identity provider first) can be a get method. For either method, the authentication response packet can include an authentication payload and a digital signature that is generated by the identity provider. However, the authentication payload and the digital signature can be located in different portions of the packet depending upon the method of the response. The method 400 can continue at 452 when the method is a get method and can continue at 454 when the method is a post method.

At 452, the packet including the authentication response can be parsed according to a format of the get method. At 454, the packet including the authentication response can be parsed according to a format of the post method. The authentication payload and the digital signature can be identified as a result of parsing the packet. Parsing can also identify additional attributes about the client device, the identity provider, the service point, and/or a level of access to be provided to the client device.

At 460, the digital signature can be validated and the authenticity of the authentication response can be verified. For example, the digital signature can be validated using a public key of a public/private key-pair of the identity provider. When the authentication response is verified as authentic and the response indicates that the client device can access the service point, additional controls can optionally be used to determine whether the client device is given access to the service point. For example, an administrator of the service point can provide additional criteria for accessing the service point that is not provided to the identity provider. As one example, attributes describing the client device can be used as a key into a data structure and/or database containing information that is not available to the identity provider. The additional information can be kept confidential to potentially increase a security of the service point, to reduce a complexity at the identity provider, and/or to increase a privacy of the users of the service point. The additional information can be local to the intermediary server and/or can be stored on a different system. The additional information can be used to make an access decision. As a specific example, a user role or a user group can be used to determine access to the service point. Applying the additional layer of controls in front of the service point can potentially provide additional security and reduce the use of computing resources of the service point. For example, providing controls at both the intermediary server and the service point can provide a multilayer defense so that if an adversary finds a way to bypass controls at one of the levels, the controls at the other level may continue to block access. Accordingly, the multilayer defense can potentially increase a level of complexity of an attack used to compromise the service point. A session can be created between the client device and the intermediary server when access is granted to the client device.

At 462, an optional request can be made for additional information about the client device. The additional information can be used to implement the multilayer defense described above. The additional information can be obtained from other services of the intermediary server, such as a denial-of-service detection service. For example, the denial-of-service detection service can determine whether the authentication response is likely to be part of a denial-of-service attack. If the response is likely to be part of an attack, access can be denied.

At 470, the method of the authentication response can optionally be changed to a post method. For example, the authentication response can be returned from the identity provider as a get method in the proxy- or service-point-initiated flow. Because the intermediary server acts on behalf of the service point, the service-point-initiated flow is actually initiated by the intermediary server.

At 480, the authentication response can be sent from the intermediary server to the service point. For example, the authentication response can be encapsulated within a packet or packets having a destination address of the private network address of the service point. The intermediary server can transmit the packet over an interconnection network or directly to the service point. The packet can include additional information, such as the session identifier and/or additional information about the client device or an entity (e.g., a user or process) associated with the client device. Additionally or alternatively, the additional information can be sent to the service point in a separate packet. The service point can validate the authentication response as if the authentication response came directly from the identity provider.

Figure 5:
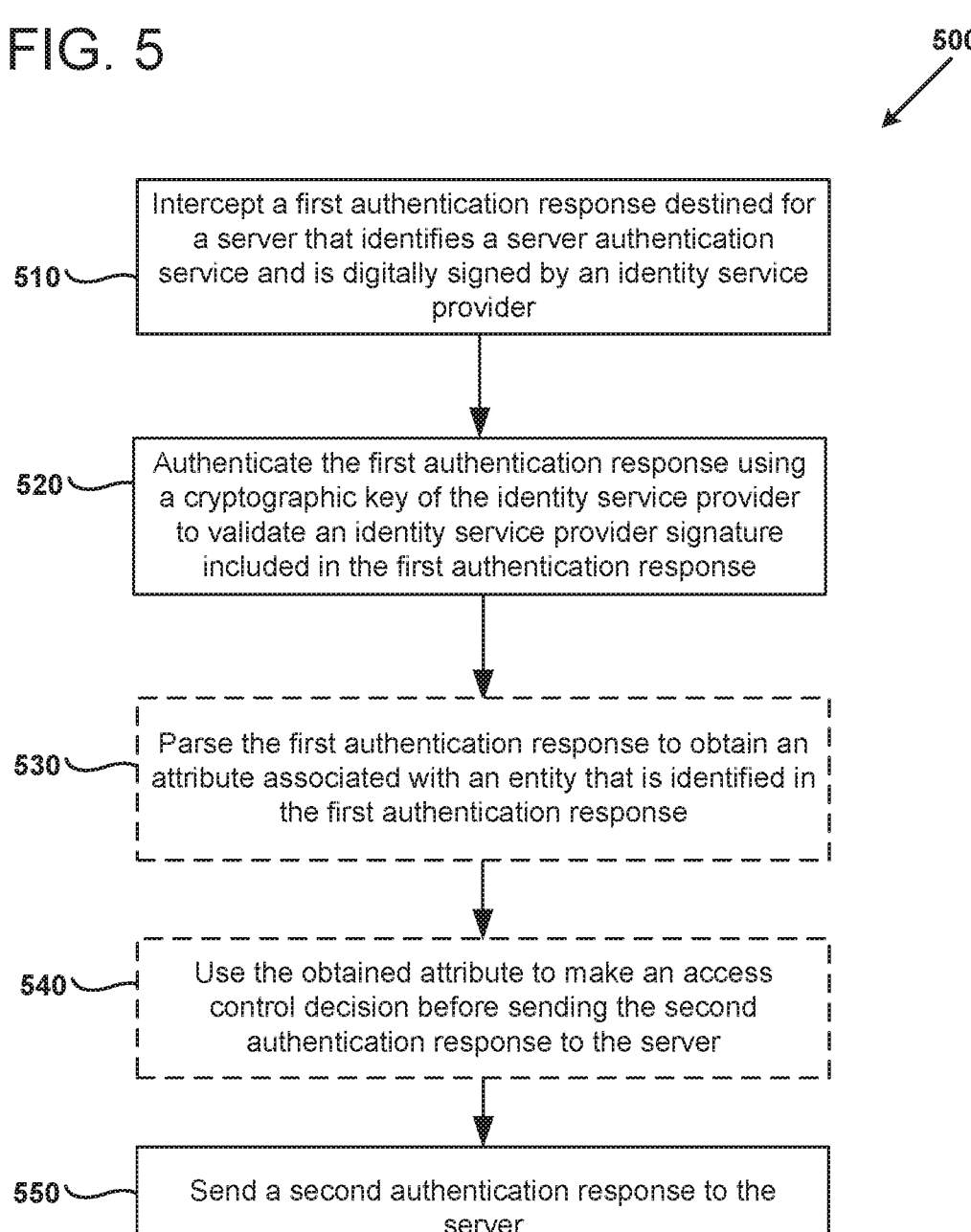
FIG. 5 is a flowchart of an example method of performing authentication using an intermediary server.

FIG. 5 is a flowchart of an example method 500 of performing using an intermediary server. Specifically, the method 500 can be used to perform performing authentication using either an identity-provider-initiated or a service-point-initiated authentication flow. The authentication flow can comply with the SAML protocol. As an example, the method 500 can be implemented by the intermediary server computers 110 and 300, such as described above in reference to FIGS. 1-3. For example, computer-executable instructions for carrying out the method 500 can be stored in a computer-readable memory of the intermediary server computer, and the instructions can be executed by a processor of the intermediary server computer to perform the method 500.

At 510, a first authentication response destined for a server computer can be intercepted by an intermediary server. The first authentication response identifies a server authentication service and is digitally signed by an identity service provider. For example, the first authentication response can include a response payload that that includes a uniform resource identifier for the server authentication service. Intercepting the first authentication response destined for the server computer can include receiving, on behalf of the server computer, the first authentication response that is addressed to a public network address of the server computer. For example, the intermediary server can receive all network traffic from a public network (e.g., the Internet) that is addressed to the public network address of the server computer so that the intermediary server can control access to the server computer. The intermediary server can forward network traffic to the server computer at a private network address of the server computer if the intermediary server determines that a source of the network traffic is authenticated to access the server computer.

At 520, the first authentication response can be authenticated using a cryptographic key of the identity service provider to validate an identity service provider signature included in the first authentication response. The first authentication response can be authenticated on behalf of the server computer by emulating the server authentication service on a component of an intermediary server that is different than the server computer. The first authentication response can be digitally signed by the identity service provider using a private key of a public-private key-pair, and the cryptographic key used to validate the identity service provider can be a public key of the public-private key-pair. As another example, the first authentication response can be digitally signed by the identity service provider using a shared symmetric key, and the cryptographic key used to validate the identity service provider can also be the shared symmetric key. Authenticating the first authentication response can verify an integrity of the response payload generated by the identity provider.

At 530, the first authentication response can optionally be parsed to obtain an attribute associated with an entity that is identified in the first authentication response. For example, the entity can be a client device, a process executing on the client device, or a user of the client device. Attributes can include an entity identifier or name, an organization, a group, a role, and/or a level of access to be provided to the client device.

At 540, the obtained attribute can optionally be used to make an access control decision before sending (550) a second authentication response to the server computer that identifies the server authentication service. For example, the obtained attribute can be used as a key into a data structure and/or a database containing information that is not available to the identity provider. As a specific example, a user group of the entity can be used to make the access control decision.

At 550, a second authentication response can be sent to the server computer. The second authentication response identifies the server authentication service. The second authentication response can include a response payload and the identity service provider signature that matches the response payload and the identity service provider signature of the first authentication response. Sending the second authentication response to the server computer can include translating the public network address of the server computer to a private network address of the server computer and sending the second authentication response to the private network address of the server computer. The first authentication response and the second authentication response can have the same or different methods based on how the authentication flow was initiated. For example, when the flow is initiated by the identity provider, both the first authentication response and the second authentication response can include a HTTP post method. As another example, when the flow is initiated by the intermediary server on behalf of the server computer, the first authentication response can include a HTTP get method and the second authentication response can include a HTTP post method.

FIG. 6 is a flowchart of an example method 600 of performing authentication using an intermediary server. Specifically, the method 600 can be used to perform authentication using an intermediary-initiated authentication flow, where the intermediary acts on a server computer's behalf. The authentication flow can comply with the SAML protocol. As an example, the method 600 can be implemented by the intermediary server computers 110 and 300, such as described above in reference to FIGS. 1-3. For example, computer-executable instructions for carrying out the method 600 can be stored in a computer-readable memory of the intermediary server computer, and the instructions can be executed by a processor of the intermediary server computer to perform the method 600.

At 610, a first request can be intercepted at an intermediary server, the intercepted request being destined for a server computer. For example, the first request can be requesting a web page that is hosted at the server computer. The first request can be addressed to a public network address of the server computer. The intermediary server can intercept all network traffic, on behalf of the server computer, that is addressed to the public network address(es) of the server computer. The intermediary server can selectively forward intercepted network traffic to the server computer at a private network address of the server computer based on access control criteria managed by the intermediary server.

At 620, it can be determined whether the intercepted request is authenticated and/or authorized to access the server computer. The intercepted request can be associated with an entity (e.g., a user, process, or device) that is explicitly identified in the request or determined from a source address of the request. The intermediary server can maintain a session data structure that includes session identifiers for entities that are currently authenticated to access the server computer. For example, a session for a given entity can be opened after a service provider authenticates the entity in an authentication response (see 640) and the authentication response is authenticated (650). The session for the given entity can be closed after a given amount of time or a lack of activity from the entity. If an open session (also referred to as an active session) exists for the entity associated with the request, the request may be authenticated and authorized to access the server computer and the request can be forwarded to the server computer. However, if there is not an active session for the entity associated with the request, the request is not authenticated and/or authorized to access the server computer.

At 630, in response to determining that the intercepted request is not authenticated to access the server computer, an authentication request can be sent from the intermediary server. The authentication request can be destined for the identity service provider. As one example, the authentication request can be returned to the source address of the request to be redirected to the identity provider. For example, the authentication request can include an HTTP redirect code. As one example, the authentication request can be formatted to masquerade as an authentication request originating from the server computer, where the formatting can include an identifier for a server authentication service of the server and/or information about the server, the intercepted request, and/or the entity associated with the intercepted request.

At 640, a first authentication response destined for the server computer can be intercepted by the intermediary server. The first authentication response identifies a server authentication service and is digitally signed by the identity service provider. For example, the first authentication response can include a response payload that that includes a uniform resource identifier for the server authentication service. Intercepting the first authentication response destined for the server computer can include receiving, on behalf of the server computer, the first authentication response that is addressed to a public network address of the server computer.

At 650, the first authentication response can be authenticated using a cryptographic key of the identity service provider to validate an identity service provider signature included in the first authentication response. The first authentication response can be authenticated on behalf of the server computer by emulating the server authentication service on a component of the intermediary server. The first authentication response can be digitally signed by the identity service provider using a private key of a public-private key-pair, and the cryptographic key used to validate the identity service provider can be a public key of the public-private key-pair. As another example, the first authentication response can be digitally signed by the identity service provider using a shared symmetric key, and the cryptographic key used to validate the identity service provider can also be the shared symmetric key.

At 660, in response to validating the identity service provider signature, a second authentication response can be sent to the server computer. The second authentication response identifies the server authentication service. The second authentication response can include a response payload and the identity service provider signature that matches the response payload and the identity service provider signature of the first authentication response. Sending the second authentication response to the server computer can include translating the public network address of the server computer to a private network address of the server computer and sending the second authentication response to the private network address of the server computer. While the first authentication response can include a HTTP get method, the second authentication response can include a HTTP post method.

Example Computing Environments

Figure 7:
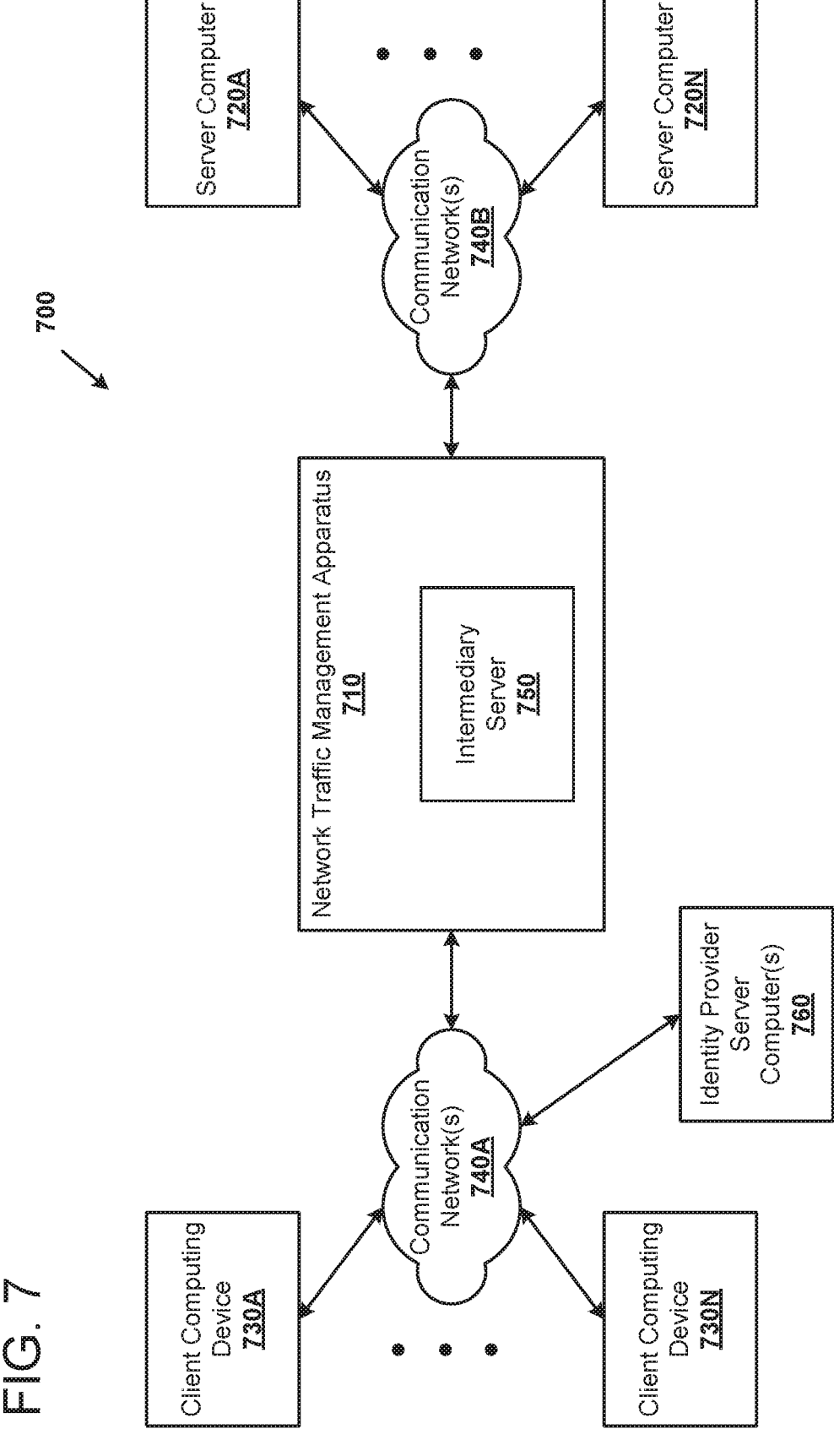
FIG. 7 is a block diagram of an example client-server architecture including a network traffic management appa-ratus executing an intermediary server.

FIG. 7 illustrates an example client-server architecture 700 that incorporates a network traffic management apparatus 710 including an intermediary server 750. The client-server architecture 700 includes a network traffic management apparatus 710 that is coupled to one or more server computers (such as server computers 720A-N), and one or more client devices (such as client computing devices 730A-N) via one or more communication networks (such as the communication networks 740A and 740B). The server computers 720A-N can communicate with one or more additional server computer(s), such as the identity provider server computer 760, that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N so that the network traffic management apparatus 710 can intercept all network traffic flowing between the different networks 740A and 740B. In other examples, the network traffic management apparatus 710, the server computer 720A-N, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
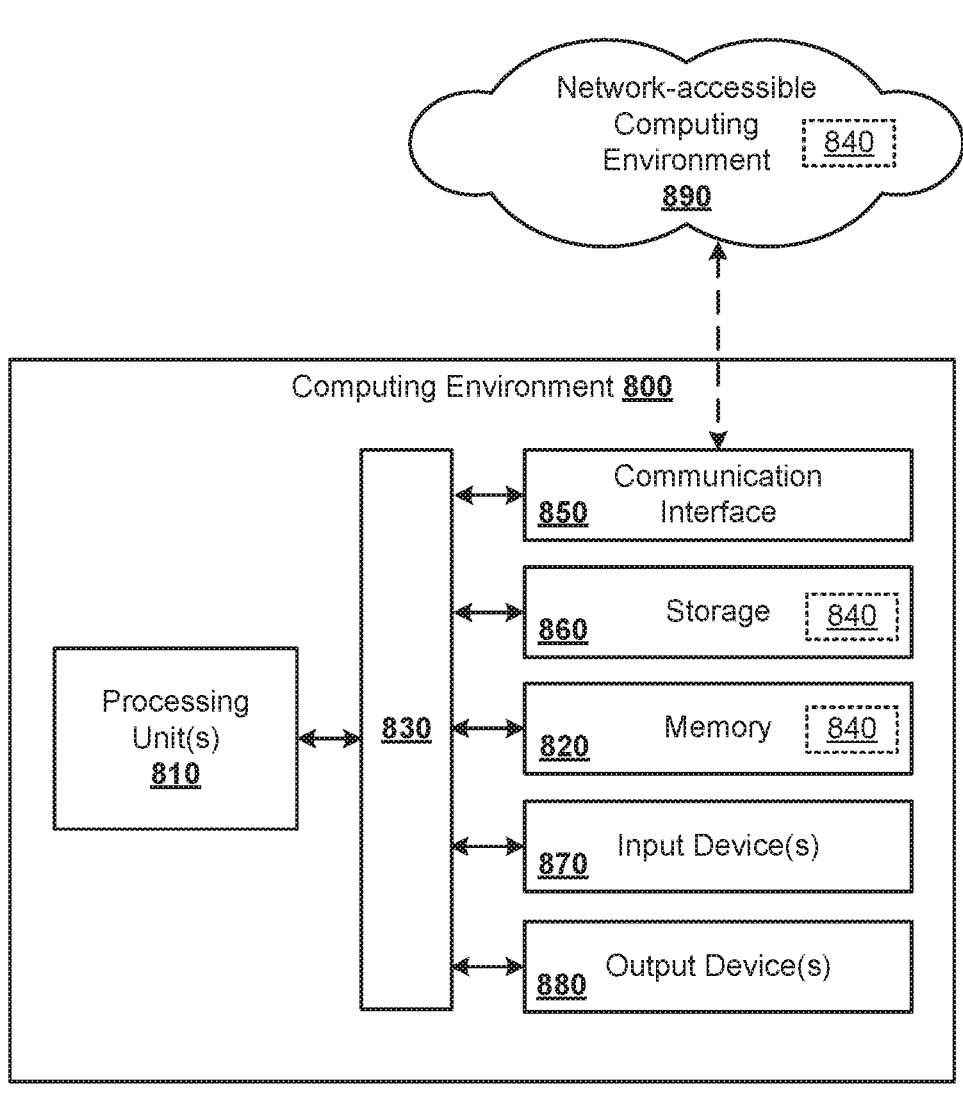
FIG. 8 is a block diagram of an example computing environment, such as can be used for an intermediary server computer.

Generally, the server computers 720A-N, the server computer(s) 760, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the #54690969\1 computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N and 760 can include any type of computing device that can exchange network data. For example, the server computers 720A-N can exchange network data with the client devices 730A-N, with each other, and/or with the server computer(s) 760. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks.

While the server computers 720A-N are illustrated as single devices, one or more actions of each of the server computers 720A-N may be distributed across one or more distinct network computing devices that together comprise one or more of the server computers 720A-N. Moreover, the server computers 720A-N are not limited to a particular configuration. Thus, the server computers 720A-N may contain network computing devices that operate using a coordinated approach, whereby one of the network computing devices of the server computers 720A-N operate to manage or otherwise coordinate operations of the other network computing devices. Each of the server computers 720A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N can operate within the network traffic management apparatus 710 itself rather than as a stand-alone server device communicating with the network traffic management apparatus 710 via communication network 740B. In this example, the one or more of the server computers 720A-N operate within the memory of the network traffic management apparatus 710.

The network traffic management apparatus 710 can include any type of computing device that can be used for managing network traffic. The network traffic management apparatus 710 can perform a number of functions, including providing network security, access control, load balancing network traffic across the server computers 720A-N, and/or accelerating network traffic associated with an application hosted by one or more of the server computers 720A-N, for example. The network traffic management apparatus 710 includes an intermediary server module 750 that is used to perform authentication and/or authorization in conjunction with the identity provider 760. Additionally, the network traffic management apparatus 710 can include other network devices such as one or more routers or switches, for example In one example, the network traffic management apparatus 710 can be a dedicated computing device including a processor (not illustrated) and a computer-readable memory (not illustrated). The memory of the network traffic management apparatus 710 can store one or more applications that can include computer-executable instructions that, when executed by the network traffic management apparatus 710, cause the network traffic management apparatus 710 to perform actions, such as to transmit, receive, or otherwise process messages, for example, and to perform other actions described and illustrated above with reference to FIGS. 1-6. Specifically, the memory can include computer-executable instructions for performing the functions of authentication and/or authorization using an intermediary server and an identity provider. The application(s) can be implemented as components of other applications. Further, the application(s) can be implemented as operating system extensions, plugins, or the like.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s) that can be managed in a cloud-based computing environment. For example, the application(s), and even the network traffic management apparatus 710 itself, can be located in virtual server(s) running in a cloud-based computing environment rather than being tied to one or more specific physical network computing devices. Also, the application(s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N and 760, or client computing devices 730A-N, for example, may be configured to operate as virtual instances on the same physical machine. In other words, one or more of the network traffic management apparatus 710, server computers 720A-N and 760, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic management apparatus including an intermediary server that performs the disclosed techniques for authentication using an intermediary server and an identity provider.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 7, a communication interface of the network traffic management apparatus 710 operatively couples to and communicates with the communication networks 740A and 740B so that the network traffic management apparatus 710 is coupled to and can communicate with the server computers 720A-N and 760 and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for authentication using an intermediary) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

The invention claimed is:

1. A method for authentication implemented in cooperation with a network traffic management system comprising one or more network traffic management modules, service provider modules, identity provider modules, server modules or client modules, the method comprising:

intercepting, using a proxy server, a first authentication response destined for a server, wherein the first authentication response identifies a server authentication service of the server and is digitally signed by an identity service provider with an encrypted identity service provider signature included in the first authentication response, wherein the proxy server has a network address that matches a public network address of the server;

authenticating, using the proxy server, the first authentication response using a cryptographic key of the identity service provider to validate the encrypted identity service provider signature included in the first authentication response; and in response to validating the encrypted identity service provider signature, sending a second authentication response from the proxy server to the server, wherein the second authentication response identifies the server authentication service of the server and comprises the encrypted identity service provider signature included in the first authentication response.

2. The method of claim 1, wherein the first authentication response is digitally signed by the identity service provider using a private key of a public-private key-pair, and the cryptographic key used to validate the identity service provider is a public key of the public-private key-pair.

3. The method of claim 1, wherein the first authentication response is authenticated on behalf of the server by emulating the server authentication service on a module of the network traffic management system that is different than the server.

4. The method of claim 1, wherein the first authentication response comprises a response payload generated by the identity service provider and authenticated using the identity service provider signature, the response payload comprising a uniform resource identifier for the server authentication service, and the second authentication response comprises the response payload and the identity service provider signature.

5. The method of claim 1, wherein intercepting the first authentication response destined for the server comprises receiving by the proxy server, on behalf of the server, the first authentication response that is addressed to a public network address of the server, and wherein sending the second authentication response to the server comprises translating the public network address of the server to a private network address of the server and sending the second authentication response to the private network address of the server.

6. An authentication system comprising one or more network traffic management modules, server modules, or client modules, memory comprising programmed instructions stored thereon, and one or more processors configured to be capable of executing the stored programmed instructions to:

intercept, using a proxy server, a first authentication response destined for a server, wherein the first authentication response identifies a server authentication service of the server and is digitally signed by an identity service provider with an encrypted identity service provider signature included in the first authentication response, wherein the proxy server has a network address that matches a public network address of the server;

authenticate, using the proxy server, the first authentication response using a cryptographic key of the identity service provider to validate the encrypted identity service provider signature included in the first authentication response; and in response to validating the encrypted identity service provider signature, send a second authentication response from the proxy server to the server, wherein the second authentication response identifies the server authentication service of the server and comprises the encrypted identity service provider signature included in the first authentication response.

7. The authentication system of claim 6, wherein the first authentication response and the second authentication response comply with a Security Assertion Markup Language protocol.

8. The authentication system of claim 6, wherein the processors are further configured to be capable of executing the stored programmed instructions to:

parse the first authentication response to obtain an attribute associated with a client device or a user of the client device that is identified in the first authentication response; and use the obtained attribute to make an access control decision before sending the second authentication response to the server that identifies the server authentication service.

9. The authentication system of claim 6, wherein the processors are further configured to be capable of executing the stored programmed instructions to:

parse the first authentication response to obtain an attribute associated with a client device or a user of the client device that is identified in the first authentication response; and use the obtained attribute to send data about the client device or the user of the client device each time the client device accesses the server computer.

10. The authentication system of claim 6, wherein the first authentication response comprises a method indicating that the first authentication response was requested by the server authentication service, and the second authentication response comprises a method indicating that the second authentication response was initiated by the identity service provider.

11. A non-transitory computer readable medium having stored thereon instructions for authentication comprising executable code that, when executed by one or more processors, causes the processors to:

intercept, using a proxy server, a first authentication response destined for a server, wherein the first authentication response identifies a server authentication service of the server and is digitally signed by an identity service provider with an encrypted identity service provider signature included in the first authentication response, wherein the proxy server has a network address that matches a public network address of the server;

authenticate, using the proxy server, the first authentication response using a cryptographic key of the identity service provider to validate the encrypted identity service provider signature included in the first authentication response; and in response to validating the encrypted identity service provider signature, send a second authentication response from the proxy server to the server, wherein the second authentication response identifies the server authentication service of the server and comprises the encrypted identity service provider signature included in the first authentication response.

12. The non-transitory computer readable medium of claim 11, wherein the first authentication response and the second authentication response comply with a Security Assertion Markup Language protocol.

13. The non-transitory computer readable medium of claim 11, wherein the first authentication response is authenticated on behalf of the server by emulating the server authentication service using the one or more processors.

14. The non-transitory computer readable medium of claim 11, further comprising instructions that, when executed by the one or more processors, causes the processors to:

parse the first authentication response to obtain an attribute associated with a client device or a user of the client device that is identified in the first authentication response; and use the obtained attribute to make an access control decision before sending the second authentication response to the server that identifies the server authentication service.

15. A network traffic management apparatus, comprising memory comprising programmed instructions stored thereon and one or more processors configured to be capable of executing the stored programmed instructions to:

intercept, using a proxy server, a first authentication response destined for a server, wherein the first authentication response identifies a server authentication service of the server and is digitally signed by an identity service provider with an encrypted identity service provider signature included in the first authentication response, wherein the proxy server has a network address that matches a public network address of the server;

authenticate, using the proxy server, the first authentication response using a cryptographic key of the identity service provider to validate the encrypted identity service provider signature included in the first authentication response; and in response to validating the encrypted identity service provider signature, send a second authentication response from the proxy server to the server, wherein the second authentication response identifies the server authentication service of the server and comprises the encrypted identity service provider signature included in the first authentication response.

16. The network traffic management apparatus of claim 15, wherein the first authentication response and the second authentication response comply with a Security Assertion Markup Language protocol.

17. The network traffic management apparatus of claim 15, wherein the first authentication response is authenticated on behalf of the server by emulating the server authentication service using the one or more processors.

18. The network traffic management apparatus of claim 15, wherein the processors are further configured to be capable of executing the stored programmed instructions to:

parse the first authentication response to obtain an attribute associated with a client device or a user of the client device that is identified in the first authentication response; and use the obtained attribute to make an access control decision before sending the second authentication response to the server that identifies the server authentication service.

19. The network traffic management apparatus of claim 15, wherein the processors are further configured to be capable of executing the stored programmed instructions to:

parse the first authentication response to obtain an attribute associated with a client device or a user of the client device that is identified in the first authentication response; and use the obtained attribute to send data about the client device or the user of the client device each time the client device accesses the server.

20. The network traffic management apparatus of claim 15, wherein the first authentication response comprises a method indicating that the first authentication response was requested by the server authentication service, and the second authentication response comprises a method indicating that the second authentication response was initiated by the identity service provider.

21. The network traffic management apparatus of claim 15, wherein the processors are further configured to be capable of executing the stored programmed instructions to:

intercept a request destined for the server;

determine that the request is not an authentication response and that an entity associated with the intercepted request is not authenticated; and send an authentication request addressed to the identity service provider, the authentication request formatted to masquerade as an authentication request from the server.

\* \* \* \* \*